United States Patent
Hunt

[15] 3,695,051
[45] Oct. 3, 1972

[54] AUTOMATIC ICE CREAM FREEZER
[72] Inventor: William B. Hunt, Rte. 2, Wickliffe, Ky. 42087
[22] Filed: June 10, 1970
[21] Appl. No.: 44,989

[52] U.S. Cl..................62/136, 192/50, 259/DIG. 34
[51] Int. Cl................................................F25c 7/10
[58] Field of Search...192/50; 259/DIG. 34, DIG. 32, 259/DIG. 19; 64/28; 62/136

[56] References Cited

UNITED STATES PATENTS

| | | |
|---|---|---|
| 1,763,567 | 6/1930 | Simmons et al. ............62/136 |
| 2,022,007 | 11/1935 | Moore ....................64/28 UX |
| 1,998,841 | 4/1935 | Modlin ........................62/136 |
| 3,108,449 | 10/1963 | Lents........................62/136 X |
| 2,623,961 | 12/1952 | Holstein ......................200/80 |

Primary Examiner—William E. Wayner

[57] ABSTRACT

A mechanism for freezing ice cream, the mechanism including a conventional, manually operated ice cream freezer to which an electro magnetical drive is connected for powering the freezer, the device including a motor, a gear reduction and a nail clutch for separating the drive from the ice cream freezer after the ice cream has become sufficiently solidified.

1 Claim, 4 Drawing Figures

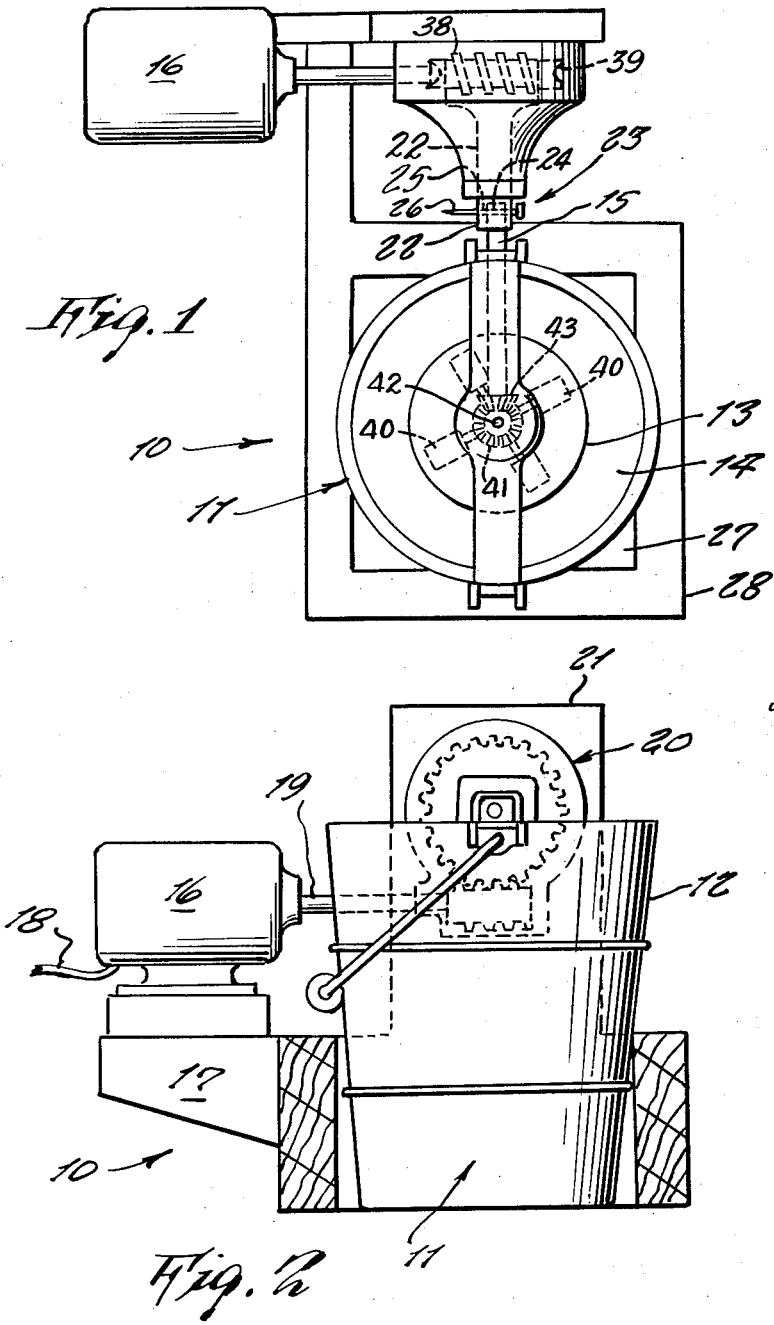
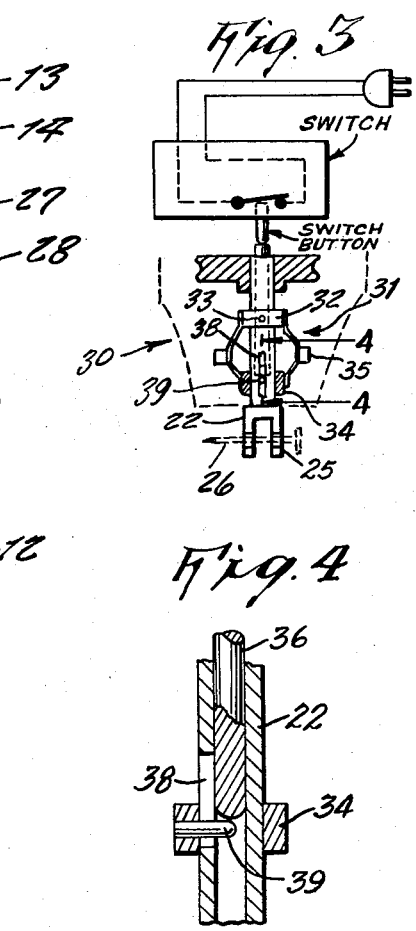
INVENTOR
WILLIAM HUNT

AUTOMATIC ICE CREAM FREEZER

This invention relates generally to ice cream freezers.

A principal object of the present invention is to provide an improved ice cream freezer for the purpose of making consistently a perfect ice cream without a failure.

Another object of the present invention is to provide an improved ice cream freezer that is motor driven so as to make ice cream quicker and easier.

A further object of the present invention is to provide an improved ice cream freezer having self-contained automatic shut-off mechanism for the freezer when the ice cream is perfectly frozen.

Still a further object of the present invention is to provide an improved ice cream freezer wherein the automatic shut-off mechanism for the freezer comprises an automatic clutch that disengages the drive mechanism from the ice cream freezer, and wherein additionally the clutch shuts off the motor so that it does not continue to run after the ice cream freezing operation is completed, thereby completely eliminating attention from an attendant.

Other objects of the present invention are to provide an improved ice cream freezer which is simple in design, inexpensive to manufacture, rugged in construction, easy to use and efficient in operation.

These and other objects will be readily evident upon a study of the following specification together with the accompanying drawing wherein:

FIG. 1 is a top plan view of the present invention;

FIG. 2 is a side elevation view thereof shown partly in cross-section;

FIG. 3 is a fragmentary top plan view of a modified clutch mechanism which additionally includes means for shutting off the drive motor.

FIG. 4 is a detail along section lines 4—4 of FIG. 3.

Referring now to the drawing in detail, the reference numeral 10 represents an automatic ice cream freezer, according to the present invention wherein there is a conventional manually operated type of ice cream freezer unit 11. Unit 11 comprises the conventional outer bucket 12 wherein there is centrally positioned a metal container 13 within which cream is placed for being frozen. The space 14 between the side walls of the bucket 12 and the container 13 is generally filled with ice and salt in a well known and conventional manner for freezing ice cream. A rotatable paddle 40 within the container 13 serves to agitate the cream for gaining a maximum portion thereof into contact with the side walls of the container 13, and thereby benefit from the cold ice upon the other side. The rotatable paddle within the container 13 is generally driven by an upstanding shaft extending out of the upper end of the container where it is mechanically driven by means of a pair of beveled gears, one of the gears 41 being upon the vertical shaft 42 and the other beveled gear 43 being upon a horizontal shaft 15 which protrudes at its one end beyond the edge of the bucket. In a conventional hand operated ice cream freezer a crank handle (not shown) is usually fitted upon the end of the shaft 15, however, in the present application, the end of the shaft 15 is connected to an automatic drive.

The automatic drive comprises an electric motor 16 mounted upon a support 17. An electric extension cord 18 serves to communicate motor 16 with an electric power source. A motor shaft 19 of the motor 16 communicates with a gear reduction unit 20 which may comprise an arrangement of gears such as is possibly suggested in the drawing and wherein there is shown a worm 38 and worm gear 39. The gear reduction unit 20 is mounted upon a vertical supporting panel 21, the gear reduction having a horizontally extending outward shaft 22 that is connected to the end of shaft 15 by a novel automatic clutch 23 which would disengage when the ice cream is finished to a proper frozen consistence. One of the shafts has a hole in its end into which the end of the other shaft is received, as shown in FIG. 1.

The automatic clutch 23 comprises a transverse opening 24 through the shaft 15 and a transverse opening 25 in the shaft 22, the openings 24 and 25 being in alignment with each other so as to receive a conventional nail 26.

The ice cream freezer 11 may be placed within a well 27 formed by a framework 28 that is rigidly integral with the support 21 to which the gear reduction is secured and the base 17 upon which the motor 16 is secured.

In operative use, ice cream is placed within the container 13 and the ice and salt is placed within the bucket around the container 13. A nail 26 is placed through the openings 24 and 25 of the shafts 15 and 22 so to engage the same together. Motor 16 is then turned on so as to cause a churning action of the cream within the container. After due time, the cream will start to freeze and thus become thick so as to cause a relatively heavy load upon the drive mechanism. This increased load will be transmitted through the nail 26 which accordingly will break when the ice cream is at a perfect, finished consistency. Thus the turning of freezer 11 will cease and the finished ice cream may be removed therefrom.

It is evident from the foregoing, that the nail clutch thus disengages the drive mechanism from the ice cream freezer so as to prevent further agitation of the cream frozen to a desired consistency. However, the above described structure does not provide a means for shutting off the motor 16 which accordingly will continue to run until the same is attended so to be shut off. In FIG. 3, however, there is shown an auxiliary mechanism comprising a nail clutch 30 which includes an automatic self-contained means for also turning off the motor, thereby freeing the attention of an attendant once the device is started.

In this form of the invention, the unit 30 includes the above described nail 26, the shaft 22 and the transverse opening 25 in the shaft 22. However, in this structure there is mounted a governor 31 upon the shaft 22, the governor 31 having a collar 32 secured by means of a pin 33 to the shaft 22 so as to cause a collar 34 to slide along the shaft according the centrifugal force upon the governor weights 35. It is to be noted that the shaft 22 is longitudinally tubular so as to receive an axially extending pin 36 therein, one end of the pin 36 being positioned or actuating the electric switch 37 that interrupts the electrical circuit between a power source and the motor 16. The shaft 22 additionally has a longitudinally extending slot 38 so as to receive a pin 39 therethrough, the pin 39 being secured to and extending transversely on the slideable collar 34.

Accordingly in operative use, when the cream has frozen to a preferred consistency, the nail 26 will break, thereby removing the load of work from the motor 16 which now begins to rotate at a relatively higher speed due to being freed. The increased speed causes the governor 31 rotating a higher speed to move the slideable collar 34 in a direction toward the fixed collar 32. This causes the pin 39 carried by the slideable collar 34 to abut against the end of the pin 36 and cause the pin to close the switch 37 thereby closing the electric power to the motor which now automatically shuts off.

Thus there has been shown an improved ice cream freezer for producing frozen ice cream which is perfect in consistency every time.

What I now claim is:

1. In an automatic ice cream freezer, the combination of a freezing unit, an electro-mechanical drive unit for operating said ice cream freezer unit and an automatic clutch between said automatic ice cream freezer unit and said electro-mechanical drive unit, said ice cream freezer unit comprising a conventional ice cream freezer of hand operated type and including an outer bucket with a centrally positioned container having a mixing paddle therewithin rotatably driven by an upwardly extending shaft driven by beveled gears, a driving one of which is on a horizontally extending shaft, and an extending end of said shaft carrying said automatic clutch, said electro-mechanical drive means comprising an electric motor with a motor shaft driving a gear reduction having an output shaft, and opening in one end of said output shaft receiving an end of said horizontal shaft, said shaft ends being normally engaged together by a shearable nail extending transversely through both said shaft ends so to transmit normal torque movement between said shafts when a torque load is not excessive but which upon excessive torque load will automatically shear so to stop said transmission between said shafts, said automatic clutch including said output shaft having a longitudinal opening in an opposite end thereof into which a slideable pin is placed, a governor having a collar fixedly secured around said output shaft, a plurality of leaf springs being secured at their one ends to said fixed collar, an intermediate portion of said leaf springs carrying each a counterweight, the opposite ends of said leaf springs being secured to a second collar that is axially slideable upon said output shaft, said output shaft having a longitudinal slot therethrough, a transverse pin through said slot being secured transversely through said slideable collar and said slideable pin, and an off-on push button of an electric switch being positioned in alignment with an outwardly extending end of said sliding pin, said switch being in an electric circuit between a power source and said motor, so that upon shearing of said transverse pin, said output shaft disengages said horizontal shaft so to cause said output shaft to increase rotational speed, thus causing said governor to slide said sliding pin so to open said switch and stop said motor.

* * * * *